United States Patent [19]

Yamada

[11] Patent Number: 5,274,041

[45] Date of Patent: Dec. 28, 1993

[54] GOLF BALL AND PROCESS FOR PRODUCING THE SAME

[75] Inventor: Mikio Yamada, Kobe, Japan

[73] Assignee: Sumitomo Rubber Industries, Ltd., Kobe, Japan

[21] Appl. No.: 778,244

[22] Filed: Oct. 17, 1991

[30] Foreign Application Priority Data

Oct. 18, 1990 [JP] Japan .................... 2-280215

[51] Int. Cl.$^5$ .................. A63B 37/12; C08L 33/02; C08L 23/26
[52] U.S. Cl. .................. 525/196; 260/998.14; 273/62; 273/235 R; 524/908; 525/221; 525/222; 525/227; 525/366; 525/368; 525/369
[58] Field of Search .................. 260/998.14; 524/908; 525/196; 273/235 R, 62

[56] References Cited

U.S. PATENT DOCUMENTS

| | | | |
|---|---|---|---|
| 4,264,075 | 4/1981 | Miller | 273/235 R |
| 4,323,247 | 4/1982 | Keches et al. | |
| 4,567,219 | 1/1986 | Tominaga et al. | |
| 4,884,814 | 12/1989 | Sullivan | |
| 4,911,451 | 3/1990 | Sullivan | 273/235 R |
| 4,929,407 | 5/1990 | Giza | |
| 4,955,966 | 9/1990 | Yuki et al. | |
| 4,984,804 | 1/1991 | Yamada et al. | |
| 4,990,574 | 2/1991 | Yamada et al. | |
| 4,999,404 | 3/1991 | Matsuki | |

FOREIGN PATENT DOCUMENTS

21995/88  3/1989  Australia.
1210698  10/1970  United Kingdom.

OTHER PUBLICATIONS

F. W. Billmeyer, "Textbook of Polymer Science", 3rd Ed., 281–286 (1984) Wiley (New York).
G. Odian, "Principles of Polymerization", 3rd Ed., 28–33, (1991) Wiley (New York).
Article entitled: "Thermal Properties of Ethylene Ionomers", Y. Tsujita et al., Journal of Applied Polymer Science, vol. 33, 1307–1314, (1987).

Primary Examiner—Joseph L. Schofer
Assistant Examiner—Fred Zitomer

[57] ABSTRACT

A golf ball having excellent impact resilience and good flying performance comprises a core and a cover for covering the core, wherein the cover contains an ionomer resin as a main material and the ionomer resin has the first peak at 85° to 95° C. and the second peak at 70° to 80° C. in its crystal melting behavior attended with the measurement by a differential scanning calorimeter. A process for producing the above golf ball is also disclosed.

3 Claims, 8 Drawing Sheets ent Example 1.
GOLF BALL AND PROCESS FOR PRODUCING THE SAME

FIELD OF THE INVENTION

The present invention relates to a golf ball having high impact resilience and a process for producing the same.

BACKGROUND OF THE INVENTION

Hitherto, in golf balls having a multilayer construction of which core is covered with a cover, an ionomer resin has been widely used as a resin for the cover (e.g. Japanese Patent Laid Open Publication Nos. 149277/1990, 182279/1990, 88087/1990, 107275/1990, 308577/1989, 223103/1989, 207343/1989, 70086/1989, 229077/1988, 311973/1988, 281145/1986, 82768/1986, 212406/1985, 14879/1985, 119766/1982, etc.).

The ionomer resin is that obtained by subjecting an ionic ethylene copolymer composed of three components of $\alpha$, $\beta$-olefin, $\alpha$, $\beta$-ethylenic unsaturated carboxylic acid, and $\alpha$, $\beta$-ethylenic unsaturated carboxylic acid metal salt, or four components of $\alpha$-olefin, $\alpha$, $\beta$-ethylenic unsaturated carboxylic acid, $\alpha$, $\beta$-ethylenic unsaturated carboxylic acid metal salt, and $\alpha$, $\beta$-ethylenic unsaturated carboxylic acid ester to partial metal crosslinking. Because of its high impact resilience as well as excellent impact resistance and cut resistance, the ionomer resin has been widely used as the resin for the cover of golf balls having a multilayer construction, as described above, and now predominates over others.

Various ionomer resins have been reported and they may be normally produced in such a manner that, using ethylene as the $\alpha$-olefin and using monobasic unsaturated carboxylic acid (e.g. acrylic acid, mathacrylic acid, etc.) or dibasic unsaturated carboxylic acid (e.g. maleic acid, fumaric acid, etc.) as $\alpha$, $\beta$-ethylenic unsaturated carboxylic acid, these carboxylic acids are partially neutralized with monovalent metal ions [e.g. sodium (Na), lithium (Li), potassium (K), etc.] or divalent metal ions [e.g. zinc (Zn), magnesium (Mg), Copper (Cu), etc.] For example, this type of the resin is commercially available under trade name of SURLYN from Du Pont de Nemours & Co. and of HI-MILAN from Mitsui Du Pont Polychemicals Co.

As described above, the ionomer resin has high impact resilience as well as excellent impact resistance and cut resistance and now dominates in the resin for the cover, and golf balls wherein the ionomer resin is used for the cover have excellent properties such as high impact resilience, etc.

However, golf balls having higer impact resilience and more excellent flying performance are requested by users.

OBJECTS OF THE INVENTION

One object of the present invention is to provide a golf ball having high impact resilience and excellent flying performance by further enhancing the impact resilience of the ionomer resin.

Another object of the present invention is to provide a process for producing the above golf ball.

These objects as well as other objects and advantages of the present invention will become apparent to those skilled in the art from the following description with reference to the accompanying drawings.

SUMMARY OF THE INVENTION

Figure 1:
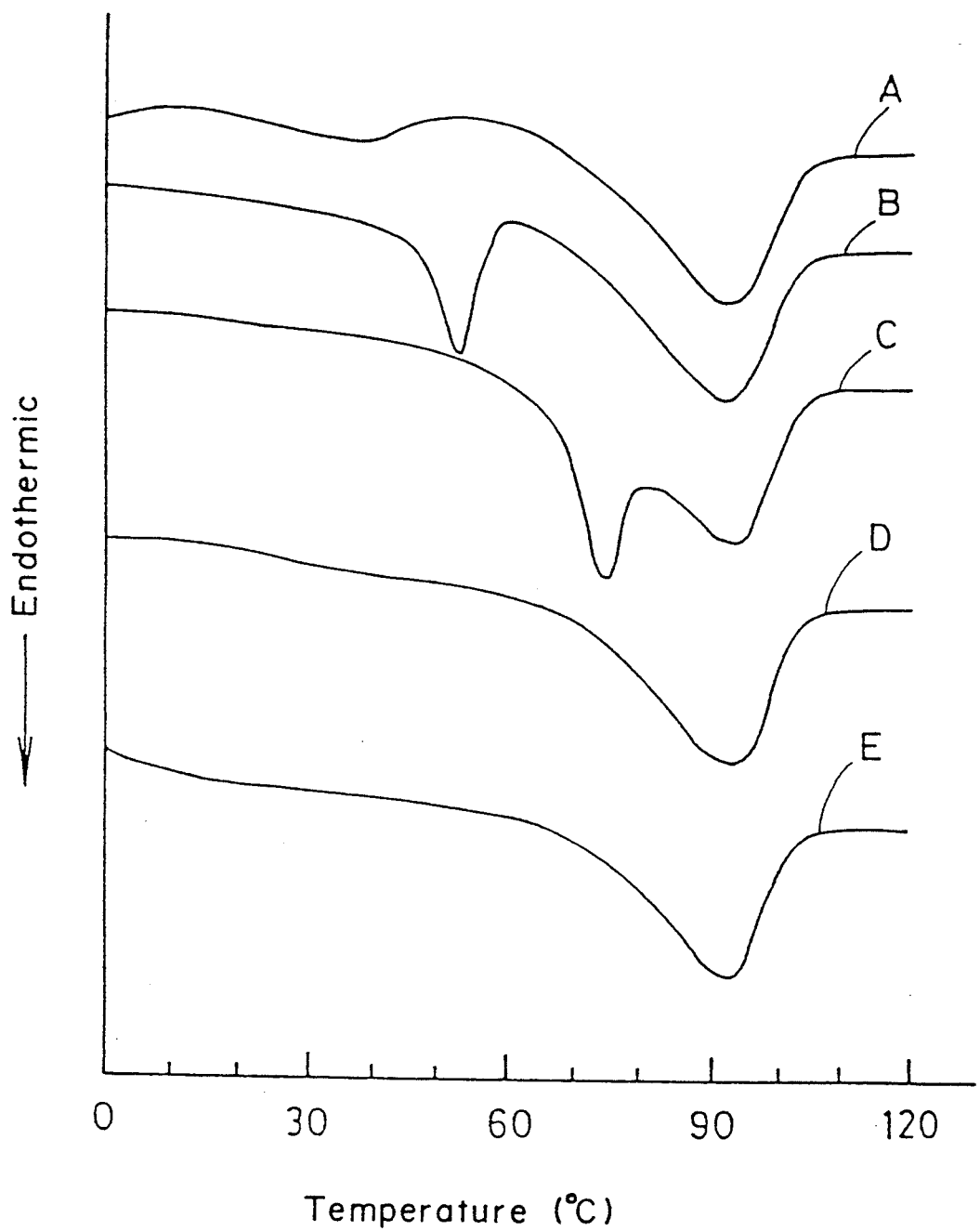
FIG. 1 is a chart illustrating the differential scanning calorimeter measurement on the cover resin of the golf ball subjected to different types of hysteresis in Experiment Example 1.
Figure 2:
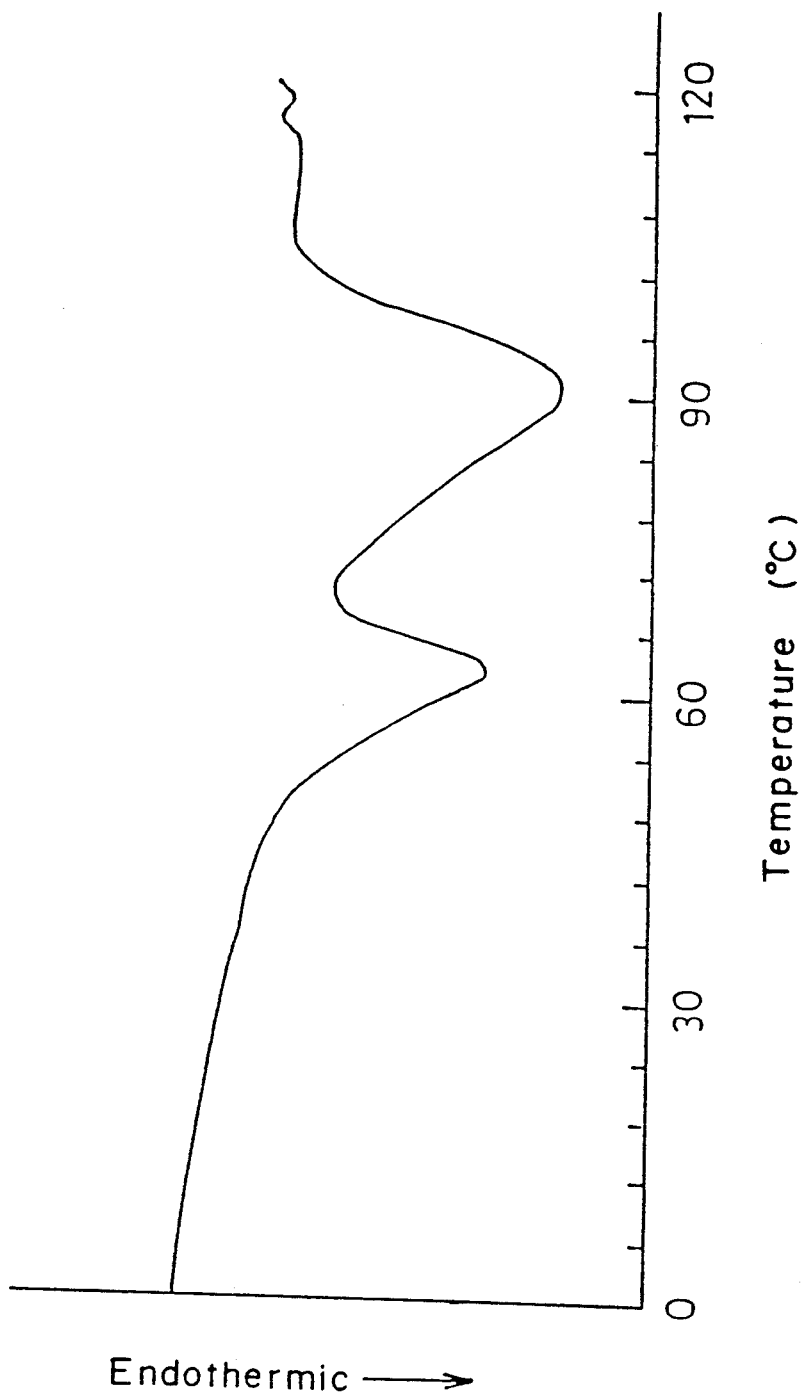
FIGS. 2 to 5 are charts illustrating the differential scanning calorimeter measurement on various commercially available golf balls.
Figure 3:
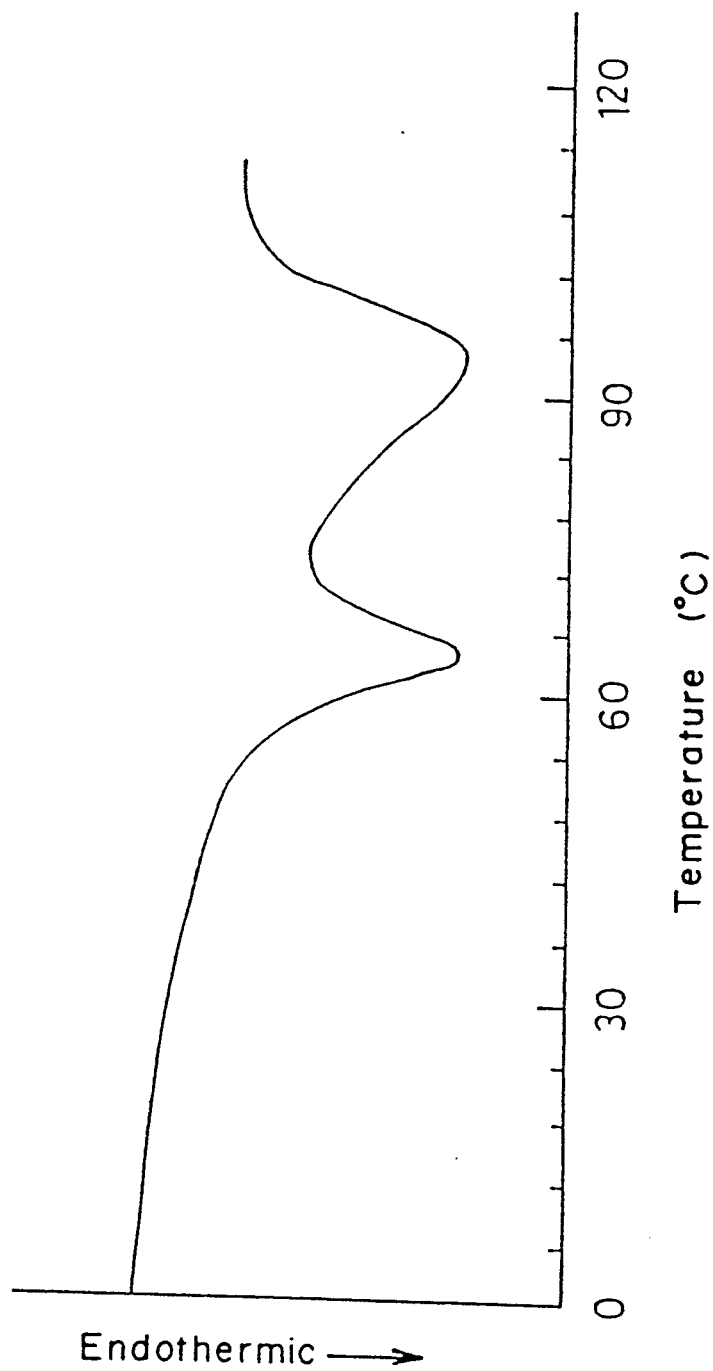
Figure 4:
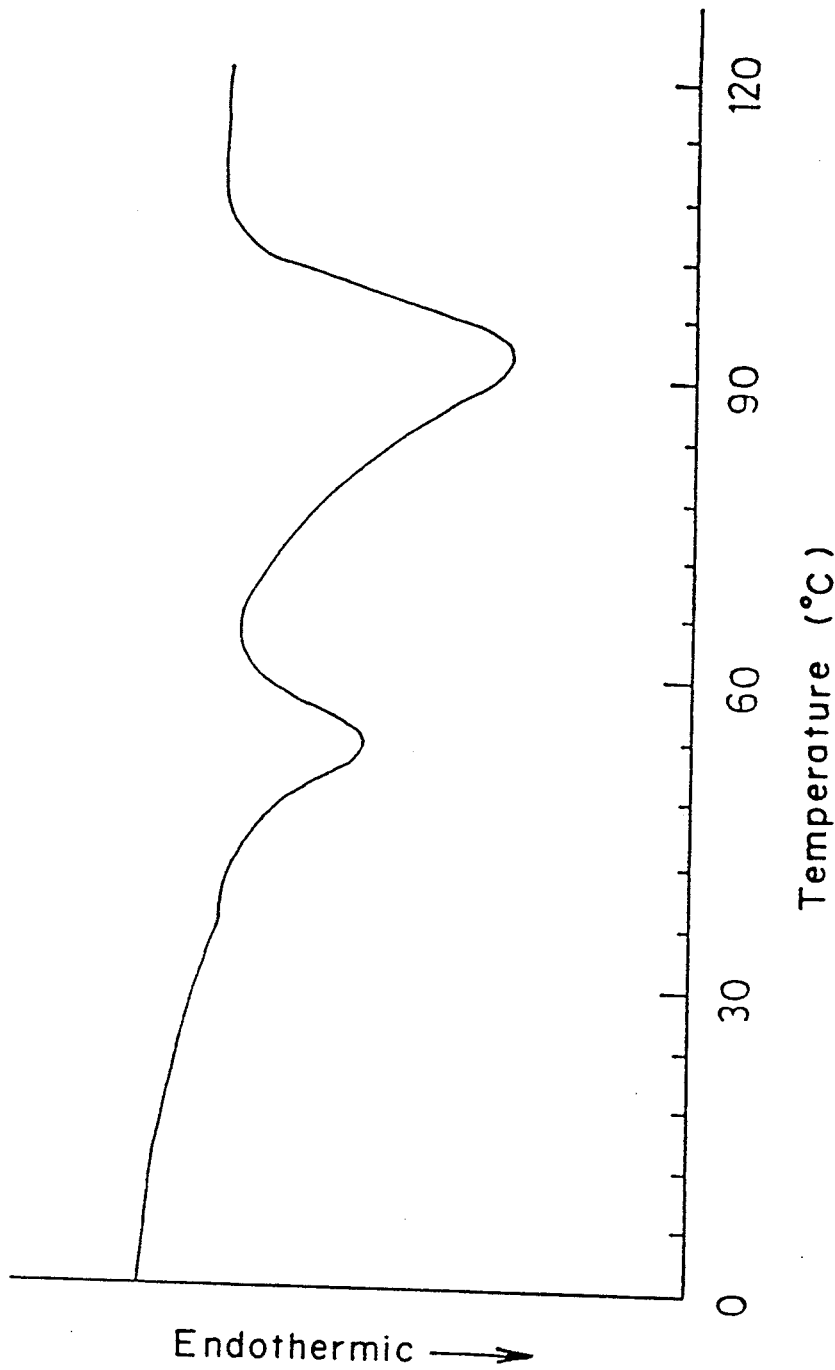
Figure 5:
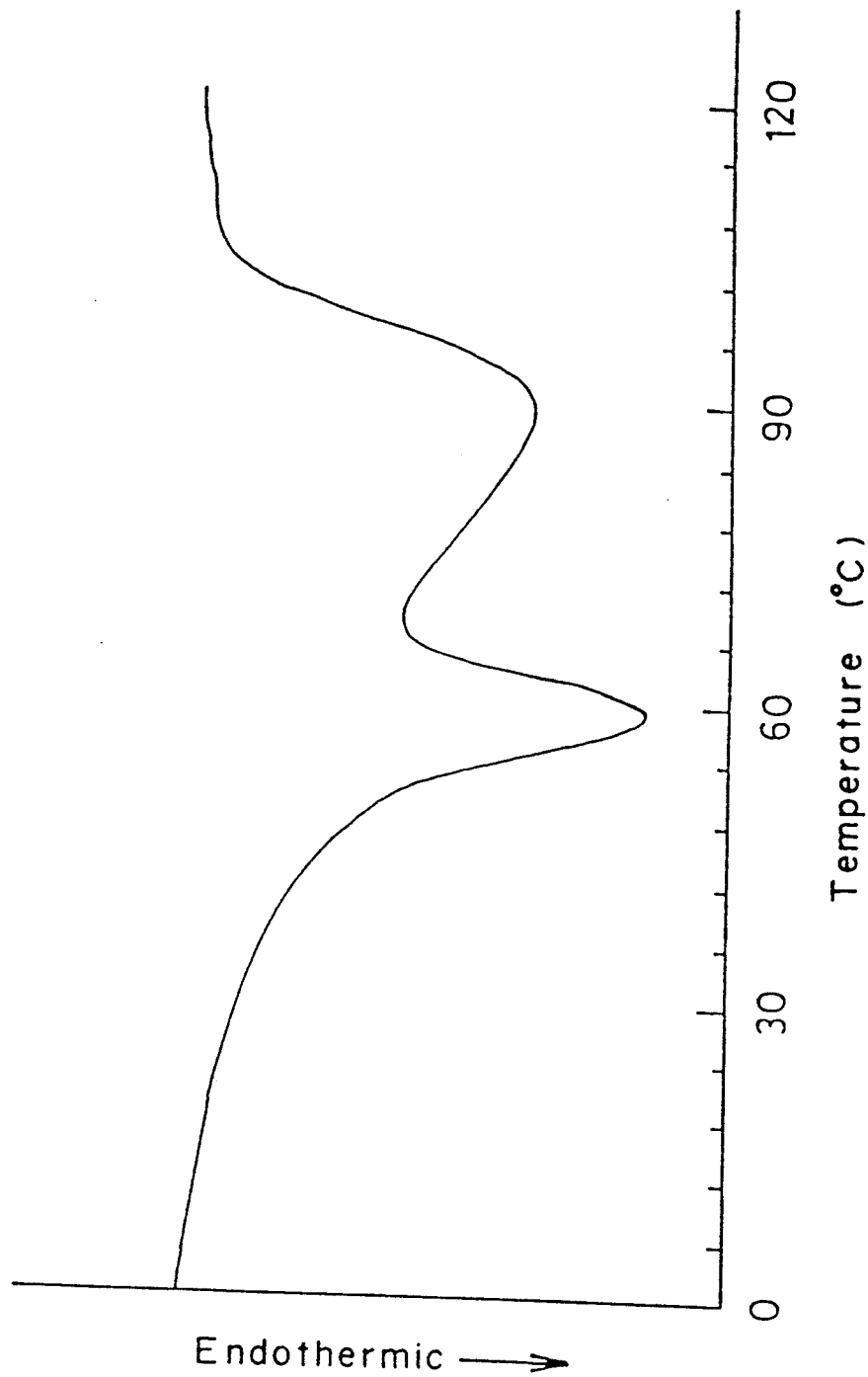

The present invention has achieved the above object by further enhancing the impact resilience of the ionomer resin in such a manner that the crystalline form of the ionomer resin is modified by annealing the ionomer resin of the cover which has been covered on a core so that the ionomer resin has the first peak at 85° to 95° C. and the second peak at 70° to 80° C. in its crystal melting behavior attended with the measurement by a differential scanning colorimeter.

The process through which the inventors have accomplished the present invention is as follows.

As described above, the ionomer resin is that obtained by subjecting an ionic ethylene copolymer composed of three components of $\alpha$-olefin, $\alpha$, $\beta$-ethylenic unsaturated carboxylic acid, and $\alpha$, $\beta$-ethylenic unsaturated carboxylic acid metal salt, or four components of $\alpha$-olefin, $\alpha$, $\beta$-ethylenic unsaturated carboxylic acid, $\alpha$, $\beta$-ethylenic unsaturated carboxylic acid metal salt, and $\alpha$, $\beta$-ethylenic unsaturated carboxylic acid ester to partial metal crosslinking.

In a catalog of Mitsui Du Pont Polychemicals Co. from which the above ionomer resin is commercially available, there is described that the ionomer resin has a side chain of polyethylene and the part of the carboxylic group is crosslinked by metal ions between the molecular chain of polyethylene, and that these two structural features produce various excellent properties of the ionomer resin. There is further described that crosslinkage by the metal ions, unlike crosslinking by general chemical bond, is characterized in that its bond strength becomes weak when heated and it becomes strong when cooled.

Further, the ionomer resin has a moderate degree of crystallization depending upon its polyethylene component and some reports have recently been made on formation of ionic crystal of the ionomer resin Mitsui Du pont Polychemicals Co. [(1) Journal of Applied Polymer Science, Vol. 33, 1307–1314, 1987, Thermal Properties of Ethylene Ionomer, Y. TSUJITA; (2)

Journal of Applied Polymer Science, Vol. 33, 2393-2402, 1987, The Crystallization and Formation of Cluster of Ethylene Ionomer during Physical Aging, MAMORU KOHZAKI; (3) Macromolecules, 1982, 22, 226-233, Kenji TADANO; (4) Macromolecules, 1989, 22, 2276-2780, Formation of Ionic Crystallites and its Effect on the Modulus of Ethylene Ionomer].

However, even in the above reports on formation of ionic crystal, no study concerning a relation between the crystalline form of the ionomer resin and the characteristic of corresponding golf ball.

Accordingly, the inventors have intensively studied about the influence of the crystalline form of the ionomer resin on the impact resilience as well as on the flying performance of the golf ball wherein the ionomer resin is used for the cover. As a result, the inventors have found that the impact resilience of the ionomer resin can be enhanced by modifying the crystalline form of the ionomer resin in such a manner that a specific annealing treatment is conducted on the ionomer resin of the cover which has been applied to the core so that the ionomer resin has the first peak at a temperature of 85° to 95° C. and the second peak at a temperature of 70° to 80° C. in its crystal melting behavior attended with the measurement by a differential scanning calorimeter, thus the present invention has been accomplished.

According to the present invention, there is provided a golf ball comprising a core and a cover for covering the core, said cover containing an ionomer resin as a main material, said ionomer resin having the first peak at 85° to 95° C. and the second peak at 70° to 80° C. in its crystal melting behavior shown in the measurement by a differential scanning calorimeter.

The present invention also provides a process for producing the above golf ball, wherein an ionomer resin for a cover which has been covered on a core is subjected to annealing treatment so that the ionomer resin has the first peak at 85° to 95° C. and the second peak at 70° to 80° C. in its crystal melting behavior attended with the measurement by a differential scanning calorimeter.

DETAILED DESCRIPTION OF THE INVENTION

In the present invention, the ionomer resin constituting the cover is required to have the first peak at 85° to 95° C. and the second peak at 70° to 80° C. in its crystal melting behavior attended with the measurement by a differential scanning calorimeter, and the measurement by a differential scanning calorimeter is conducted in the following manner.

As the apparatus of the differential scanning calorimeter, for example, there can be used DSC SSC-500 manufactured by Seiko Electric Industry K.K., DSC-50 manufactured by Shimazu Corporation, etc.

The measurement is conducted as follows.

A golf ball which has been subjected to annealing treatment is stored at constant room temperature for not less than 24 hours to cool. A sample of 5 mg in conversion to the cover resin (the resin used for the cover) is obtained from the cover of the above golf ball and cooled from room temperature to $-30°$ C. under nitrogen atmosphere. Then, the sample is heated from $-30°$ C. up to 150° C. at a heating rate of 10° C./min. to record endothermic peak attended with crystal melting. In this case, the differential scanning calorimeter measurement is conducted according to JIS K 7121 and JIS K 7122.

In the crystal melting behavior attended with the above differential scanning calorimeter measurement, the first peak appearing at 85° to 95° C. is inherent in the ionomer resin used for the cover of the golf ball and, therefore, it is referred to as the "first peak". On the other hand, the second peak at 70° to 80° C. does not appear until the ionomer resin for the cover which has been covered on the core is subjected to the annealing treatment under specific conditions. By treating the ionomer resin so that it has the second peak at 70° to 80° C., the impact resilience of the ionomer resin is enhanced and, therefore, the impact resilience of the golf ball is also enhanced, whereby excellent flying performance can be obtained.

In the present invention, as described above, the ionomer resin is that obtained by subjecting an ionic ethylene copolymer composed of three components of α-olefin, α, β-ethylenic unsaturated carboxylic acid, and α, β-ethylenic unsaturated carboxylic acid metal salt, or four components of α-olefin, α, β-ethylenic unsaturated carboxylic acid, α, β-ethylenic unsaturated carboxylic acid metal salt, and α, β-ethylenic unsaturated carboxylic acid ester to partial metal crosslinking. Among them, those using ethylene as α-olefin and using acrylic acid or methacrylic acid as α, β-ethylenic unsaturated carboxylic acid are particularly preferred.

The acid content is preferably 10 to 20% by weight, more preferably 13 to 20% by weight. That is, when it is less than 10%, it is difficult to obtain excellent characteristic by neutralization of metal ions because the amount of carboxylic acid is too small, which results in insufficient rigidity as well as poor enhancement in the impact resilience by annealing treatment. Further, when the acid content is more than 20% by weight, it becomes difficult to form a resin with high degree of neutralization by metal ions and rigidity becomes too large, which results in deterioration of the feeling in the case of hitting.

Further, the ionomer resin used in the present invention is that using monovalent metal ions (e.g. sodium, potassium, lithium, etc.) or divalent metal ions (e.g. zinc, copper, magnesium, etc.) as metal ions for partially neutralizing α, β-ethylenic unsaturated carboxylic acid. Regarding the degree of neutralization by metal ions, 30 to 70% of the carboxyl group of the carboxylic acid is preferably neutralized. When the degree of neutralization by metal ions is less than 30 mole %, desired rigidity can not be obtained, which results in deterioration of impact resilience. Further, when the degree of neutralization is more than 70% by weight, rigidity becomes too high which results in deterioration of the feeling in the case of hitting and, at the same time, melting viscosity becomes high, which results in difficulty of molding.

Since the resulting ionomer resin differs in its feature depending on a kind of metal ions used for neutralization, it is preferred to use the ionomer resin in the form of that neutralized by monovalent ions and that neutralized by divalent metal ions, or in the form wherein free carboxylic acid of an ionomer resin neutralized by monovalent ions is further neutralized by divalent metal ions and the result is ion-blended in the same molecules.

Examples of the above ionomer resin include HI-MILAN 1605, HI-MILAN 1707, HI-MILAN 1706 which are commercially available from Mitsui Du Pont Polychemicals Co., SURLIN 8940, SURLIN 8920, SURLIN 9910 which are commercially available from Du Pont de Nemours & Co.; and ESCOR EX-900, ESCOR EX-562, ESCOR EX-926 which are commercially available from EXXON Co.

The above acid content means the content of α, β-ethylenic unsaturated carboxylic acid in the ionomer resin, independent of whether neutralization by metal ions has been made or not. The acid content can be calculated in such as manner that the amount of the residual carboxyl group ([COOH]) is measured by melting an ionomer resin in tetrahydrofuran with heating and titrating it with a potassium hydroxide solution of a specified concentration in heated state and then calculating the acid content from the original carboxyl group including the amount of the carboxylic acid metal salt ([COOH]) calculated from the analysis result of a neutralizing metal. Then, the degree of neutralization by metal ions is determined by the amount of the residual carboxyl group ([COOH]) and that of the carboxylic acid metal salt ([COOH]) according to the following equation:

$$\text{Degree of neutralization (\%)} = \frac{[COOH]}{[COOH] + [COOH]} \times 100$$

Regarding monovalent metals such as sodium, etc., the metal analysis is conducted, for example, by using a polarization Zeeman atomic absorption spectrometer, type 180-80 manufactured by Hitachi Seisakusho K.K. for monovalent metals such as sodium, etc. On the other hand, regarding divalent metals such as zinc, etc., the metal analysis is conducted, for example, by using a sequential type ICP emission spectrometer, type SPS1100 manufactured by Seiko Electric Industry K.K.

The ionomer resin as described above is used as a main material for the cover. Appropriate additives such as pigments, lubricants, dispersants, antioxidants, ultraviolets ray absorbents, ultraviolet rays stabilizers, antistatic agents and the like are optionally added to the ionomer resin and then mixed to prepare a cover composition.

The cover composition thus prepared is used for covering the core and, as the core, there can be used both solid core and rubber thread wound core. As the method for covering the core with the cover composition, there can be used various methods. For example, for the solid core, there can be normally employed a method comprising directly covering the core by injection molding. On the other hand, for the rubber thread wound core, there can be normally employed a method comprising forming the cover composition into hemispheric shell-like shape, so called "half shell" in advance, covering two pieces of the resulting half shell on the rubber thread wound core to form a sphere, followed by hot compression molding to cover the core. In that case, the thickness of the cover is normally 1.0 to 3.0 mm.

The annealing treatment for enhancing the impact resilience by modifying the crystalline form of the ionomer resin is conducted on the ionomer resin for the cover which has been covered on the core. This is due to the fact, as is clear from Experiment Example 1 hereinafter, that even if the ionomer resin having the second peak at 70° to 80° C. is obtained by subjecting it to annealing treatment, the second peak disappeared and improvement of impact resilience is disappeared if it is exposed to a temperature higer than the crystal melting temperature thereafter.

The temperature in the case of annealing treatment varies depending upon a kind of the ionomer resin and the temperature of 45° to 63° C. is preferred. When the temperature in the case of annealing treatment is less than 45° C., the temperature of the second peak is lowered, which results in poor improvement of impact resilience. When the temperature exceeds 63° C., the second peak overlaps with the first peak if annealing treatment is conducted for 72 hours (although depending upon the treating time), which results in deterioration of impact resilience. The time of annealing treatment is normally 3 to 240 hours. When the time is too short, the crystalline form can not be sufficiently modified, which results in no improvement of impact resilience. On the contrary, when the time is too long, production efficiency is inferior and heat deterioration of core is caused, and it is not preferred.

The fact that the ionomer resin has the first peak at 85° to 95° C. and the second peak at 70° to 80° C. in its crystal melting behavior shown in the measurement by differential scanning calorimeter means that the first melting behavior, or the melting point the ionomer resin has had intrinsically at 85° to 95° C. is arisen in the differential scanning calorimeter measurement and, further, the second crystal melting behavior at 70° to 80° C. resulting from annealing treatment is arisen. In the present invention, the reason that the ionomer resin is requested to have the second peak at 70° to 80° C. is as follows. That is, when the temperature of the second peak is lower than 70° C., impact resilience is not improved because of insufficient progress of crystallization. When the temperature of the second peak is higher than 80° C., the second peak overlaps with the first peak although crystallization is progressed, which results in deterioration of impact resilience.

The annealing treatment exhibits its effect by applying to the ionomer resin for the cover. In the present invention, since the annealing treatment is conducted on the ionomer resin for the cover which has been covered on the core, it is impossible to selectively subject only the ionomer resin to annealing treatment. In practice, annealing treatment is applied to the whole cover.

The golf ball of the present invention has high impact resilience as well as excellent flying performance. Further, the golf ball has also good feeling in the case of hitting.

The following Examples, Comparative Examples and Experiment Example further illustrate the present invention in detail but are not to be construed to limit the scope thereof. In Experiment Example 1, change of physical properties of the ionomer resin by annealing treatment is cleared before Examples.

EXPERIMENT EXAMPLE 1

Experiment Example 1 relates to a two-piece solid golf ball, and its solid core and cover were prepared as follows.

Firstly, a solid core was made by adding 35 parts by weight of zinc acrylate, 10 parts by weight of zinc oxide and 1 part by weight of a vulcanization initiator (dicumyloxide, PERCUMYL manufactured by Nihon Yushi K.K.) to 100 parts by weight of cys-1,4-polybutadiene (JSR BR-01 manufactured by Japan Synthetic Rubber K.K.), kneading the mixture with an internal mixer, cutting the mixture into a specified size and filling it into a die for molding the core, followed by hot compression molding at 160° C. for 20 minutes. The diameter of the solid core thus prepared was 38.5 mm.

In addition to the above solid core, the cover composition was prepared by using HI-MILAN 1707 and HI-MILAN 1706 manufactured by Mitsui Du Pont Polychemicals Co. as the ionomer resin, kneading the mixture of the formulation as shown in Table 1 with an extruder. HI-MILAN 1707 contains 15% by weight of methacrylic acid and it is of the type neutralized by sodium ions. The degree of neutralization by sodium ions is about 60 mole %. HI-MILAN 1706 contains 15% by weight of methacrylic acid and it is of the type neutralized by zinc ions. The degree of neutralization by zinc is about 60 mole %. The antioxidant in Table 1 is Irganox 1010 (trade name) manufactured by Ciba-Geigay Co. and the lubricant is zinc stearate, both of which are also used in the cover formulation hereinafter as antioxidants and lubricants, respectively.

TABLE 1

|  | parts by weight |
|---|---|
| HI-MILAN 1707 | 50 |
| HI-MILAN 1706 | 50 |
| Titanium oxide | 1 |
| Precipitated barium sulfate | 3 |
| Antioxidant | 0.01 |
| Lubricant | 0.001 |

Then, the cover composition as described above was injection-molded to directly cover the core and was optionally subjected to annealing treatment. Then, it was optionally finished through a painting process to obtain a two-piece solid golf ball having a diameter of 42.8 mm.

Immediately after cover molding (which means the molding for covering the cover composition on the core), the degree of crystallization of the ionomer resin is low. In the crystal melting behavior attended with the measurement by a differential scanning calorimeter, a peak was observed only at about 90° C. as shown in a curve A in FIG. 1. However, after cover molding, when the golf ball was stored at room temperature (23° C.) for 3 months and differential scanning calorimeter measurement was conducted again, new peak was appeared at about 55° C. as shown in a curve B in FIG. 1. This shows that crystallization of the ionomer resin proceeds and grows slowly during storage for 3 months after cover molding.

On the other hand, after cover molding, when the golf ball which has been subjected to annealing treatment at 50° C. for 7 days was once stored at room temperature for 24 hours and differential scanning carolimeter measurement was conducted on the cover, the second peak appeared at 70 to 80° C. in addition to the first peak at about 90° C. as show in a curve C in FIG. 1.

As is clear from the above, the second peak appears depending upon the elapsed time after cover molding and the temperature range of the peak varies depending upon the thermal hysteresis after cover molding.

Further, when the crystal melting behavior of the cover resin of a commercially available golf ball was measured by the differential scanning calorimeter, the results were as shown in Table 2, where no peak was observed at 70° to 80° C. This shows no evidence that the golf ball had been subjected to annealing treatment so that it has the second peak at 70° to 80° C. as is described in the present invention.

TABLE 2

| Sample | Country of the production | First peak (°C.) | Second peak (°C.) |
|---|---|---|---|
| Ball A | Japan | 91.3 | 62.6 |
| Ball B | Japan | 94.0 | 64.4 |
| Ball C | U.S.A. | 92.7 | 54.0 |
| Ball D | U.S.A. | 89.7 | 59.4 |

(Note) All balls are commercially available.

The differential scanning calorimeter charts of a commercially available ball A, a commercially available ball B, a commercially available ball C and a commercially available ball D are shown in FIG. 2, FIG. 3, FIG. 4 and FIG. 5, respectively.

After the above cover molding, the golf ball was stored at room temperature (23° C.) for 3 months and the cover of the golf ball which was not subjected to annealing treatment was once heated and molten up to 150° C. by the differential scanning calorimeter. After natural cooling, it was measured again by the differential scanning calorimeter and the resulting chart is shown by a curve D in FIG. 1. Similarly, the cover which has been subjected to annealing treatment at 50° C. for 7 days was once heated up to 150° C. by the differential scanning calorimeter. After natural cooling, it was measured again by the differential scanning calorimeter and the resulting chart is shown by a curve E in FIG. 1.

As shown in FIG. 1, both curves D and E show nearly the same crystal melting behavior as the curve A which shows the crystal melting behavior of the ionomer resin immediately after cover molding, and no second peak is observed. As is clear from the results, the crystal growth by annealing treatment after cover molding disappears if the cover is exposed to the temperature higher than the crystal melting temperature thereafter.

As is clear from the above, regarding the ionomer resin as a low crystalline polymer, the crystal does grow or does not grow, or the crystal which has once grown melts according to the thermal hysterisis after cover molding.

EXAMPLES 1 AND 2 AND COMPARATIVE EXAMPLES 1 TO 3

Based on the knowledge obtained from the above Experiment Example 1, five kinds of golf balls were prepared by subjecting the covers which have been covered on the cores to annealing treatment under the conditions as shown in Table 3, and a relation between the annealing temperature and the impact resilience of the golf ball was examined.

Figure 6:
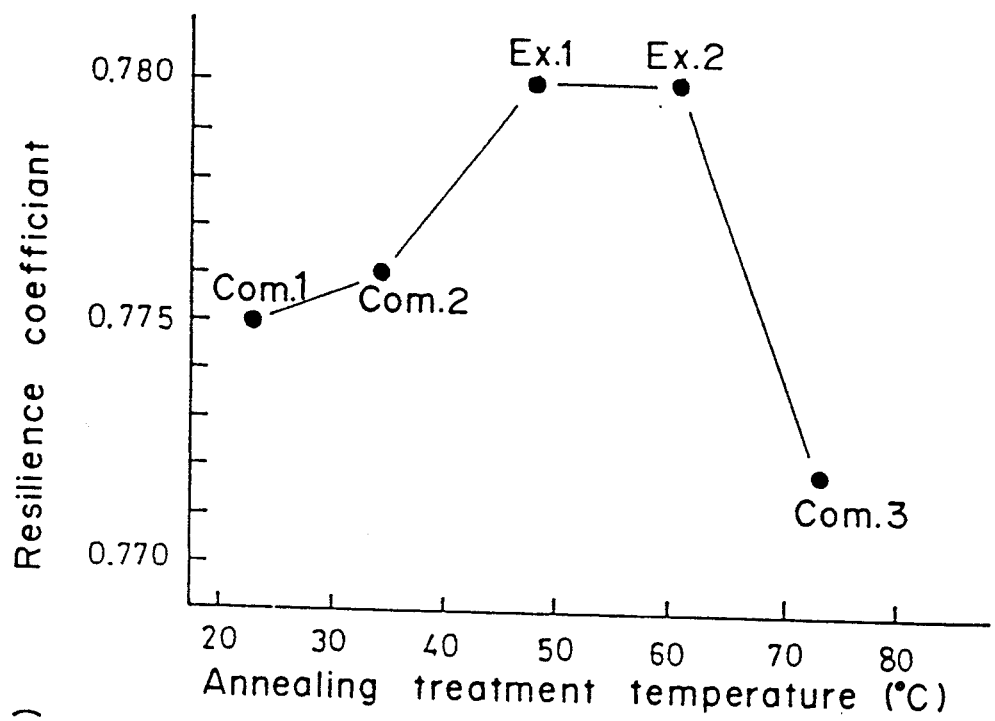
FIG. 6 is a graph illustrating a relation between the resilience coefficient and the annealing treatment temperature of the golf balls in Examples 1 and 2 and Comparative Examples 1 to 3.

By using the cover composition of the formulation as shown in Table 1 hereinabove, the cover composition was injection-molded to cover the same solid core as that in Experiment Example 1. After it was subjected to annealing treatment as described in Table 3, the coefficient of restitution of the golf ball after annealing treatment was measured. The results are shown in Table 3. Further, a relation between the temperature of annealing treatment and the coefficient of restitution is shown in FIG. 6. In this case, the coefficient of restitution is a measure of the impact resilience of the golf ball, and the method for measuring the coefficient of restitution is as follows.

Method for measuring coefficient of restitution:

By using an air-gun type resilience meter, it is measured at a firing rate of 45 m/s. The results are represented by the average of 10 measurements for each ball.

TABLE 3

|  | Annealing treatment | Coefficient of restitution |
|---|---|---|
| Example 1 | 48° C. × 4 days | 0.780 |
| Example 2 | 60° C. × 4 days | 0.780 |
| Comp. Example 1 | 23° C. × 4 days | 0.775 |
| Comp. Example 2 | 35° C. × 4 days | 0.776 |
| Comp. Example 3 | 70° C. × 4 days | 0.772 |

Figure 9:
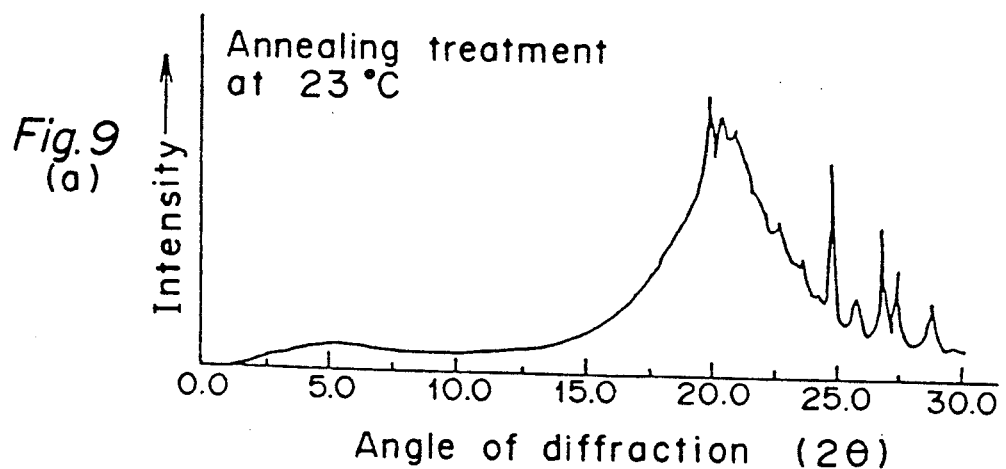
FIGS. 9a to 9c are charts illustrating X-ray diffraction pattern of those obtained by press-molding the cover composition of the formulation shown in Table 1 into sheets of 2 mm in thickness, storing the sheets for a certain period of time and subjecting them to annealing treatment at 23° C., 48° C. and 70° C. for four days.
Figure 9:
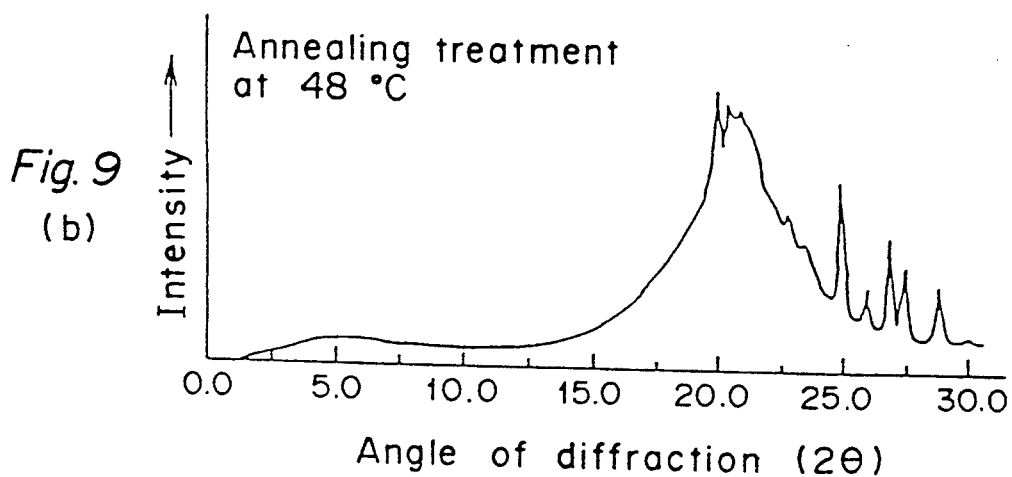
Figure 9:
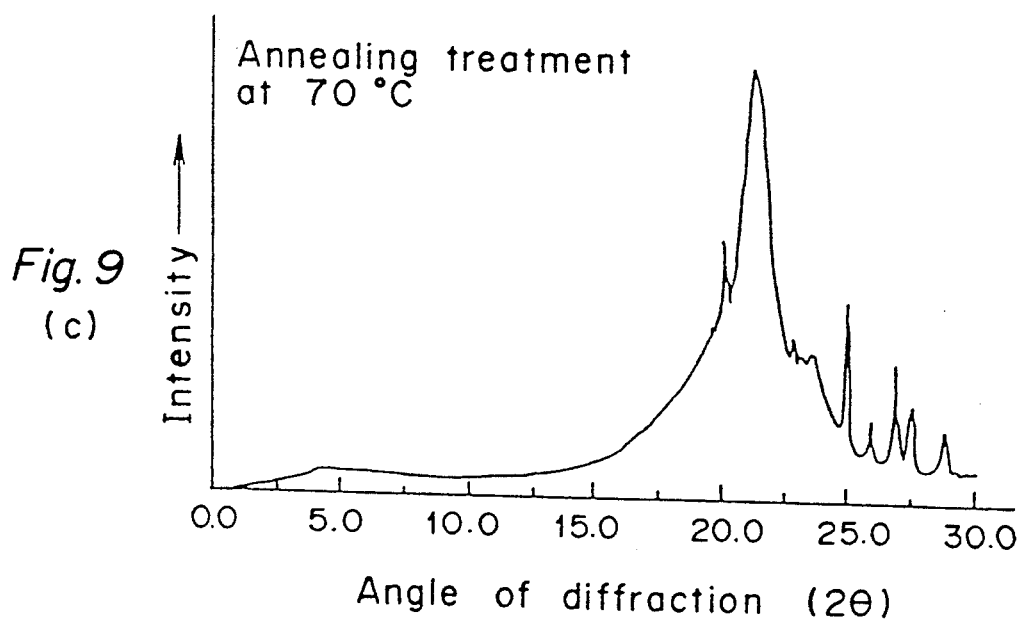

Further, the cover composition of the formulation as shown in Table 1 was press-molded into a sheet of 2 mm in thickness. After molding, the sheet was stored at 23° C. for 7 days and subjected to annealing treatment at 23° C., 48° C. and 70° C., respectively, for 4 days. Then, the flexural modulus and X-ray diffraction were measured. The results of the flexural modulus are shown in Table 4. Further, X-ray diffraction chart is shown in FIG. 9. In this case, the conditions under which the press molding was done was that the sample was subjected to hot compression molding at 180° C. for 5 minutes and cooled for 30 minutes. Further, the flexural modulus was measured by using a stiffness tester manufactured by Toyo Seiki K.K. according to JIS K 7106. The above temperature 23° C. of annealing treatment was set in accordance with that of Comparative Example 1, the above temperature 48° C. of annealing treatment was set in accordance with that of Example 1 and the above temperature 70° C. of annealing treatment was set in accordance with that of Comparative Example 3.

TABLE 4

| Annealing treatment temperature (°C.) | Flexural modulus (kg/cm²) |
|---|---|
| 23 | 3,180 |
| 48 | 4,250 |
| 70 | 4,700 |

Examples 1 and 2, high impact resilience can be obtained.

Further, as shown in Table 4, the flexural modulus increases with increasing temperature of annealing treatment. As is clear from X-ray diffraction chart of FIG. 9, the degree of crystallization increases with increasing temperature of annealing treatment, whereas the coefficient of restitution does not increase with increasing the flexural modulus and the degree of crystallization, as is clear from the results of FIG. 6.

Figure 7:
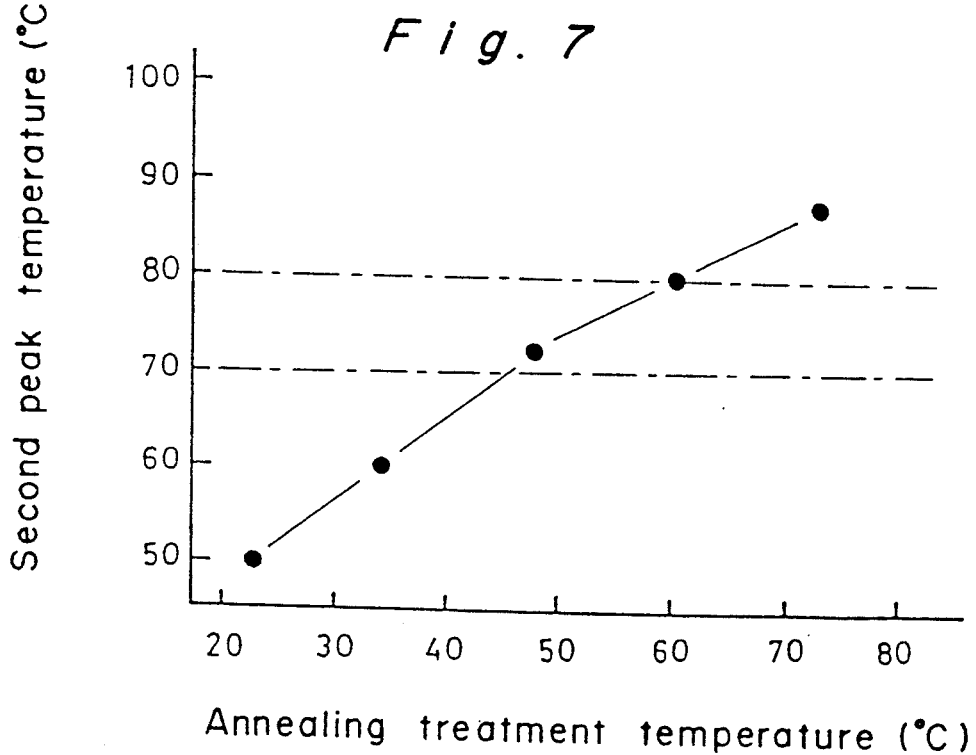
FIG. 7 is a graph illustrating a relation between the annealing treatment temperature of the golf balls in Examples 1 and 2 and Comparative Examples 1 to 3 and the second peak temperature of the cover resin in the differential scanning calorimeter measurement.

A relation between the second peak temperature and the temperature of annealing treatment in the differential scanning calorimeter measurement of golg balls is shown in FIG. 7. Further, the chart of the measurement by the differential scanning calorimeter is shown in FIG. 8.

As is clear from the comparison between FIG. 7, FIG. 6 and Table 3, high coefficient of restitution can be obtained when the second peak in the measurement by the differential scanning calorimeter ranges between 70° to 80° C. and, therefore, high impact resilience can be obtained by conducting annealing treatment so that the second peak ranges between 70° to 80° C.

Figure 8:
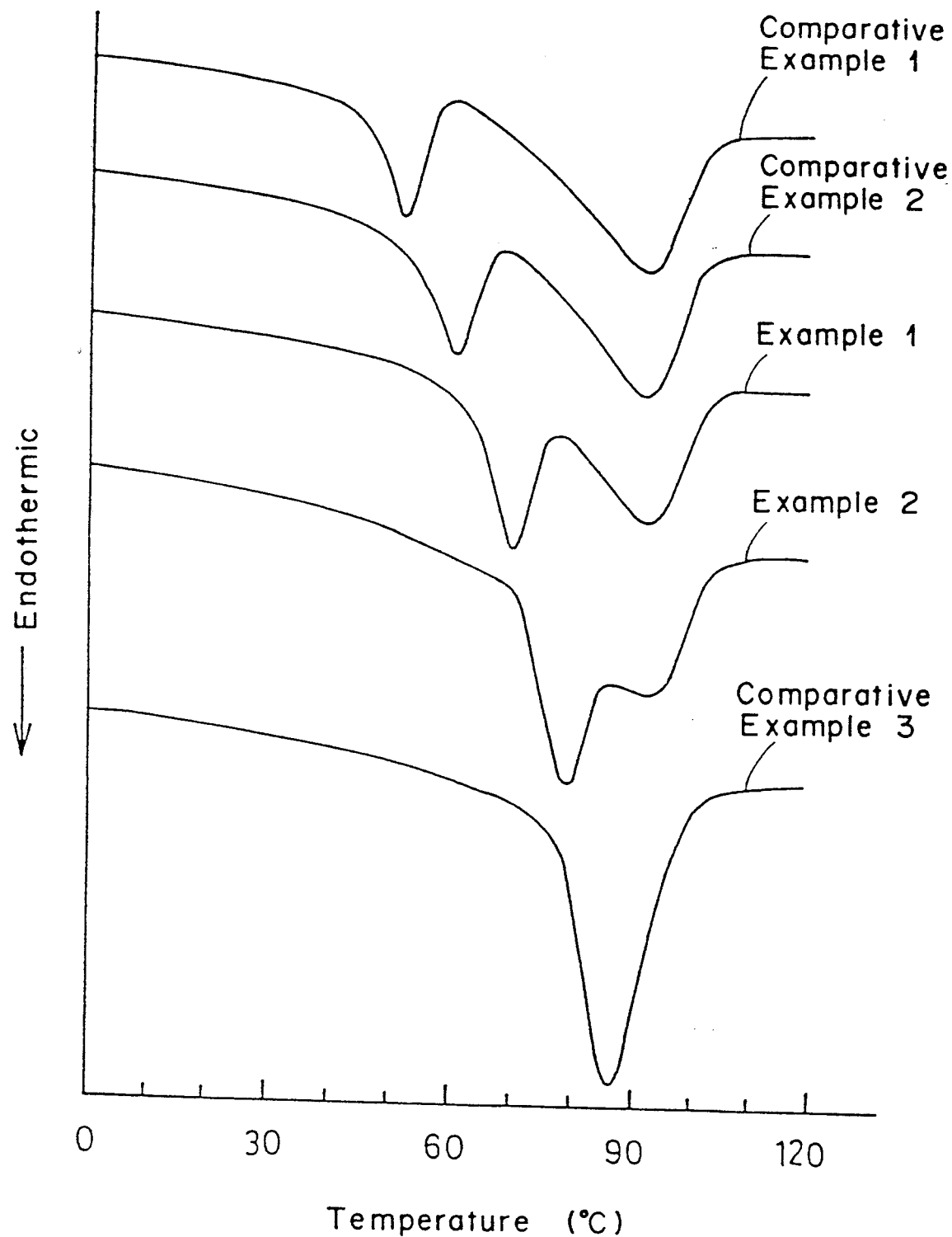
FIG. 8 is a chart illustrating the differential scanning calorimeter measurement on the golf balls in Examples 1 and 2 and Comparative Examples 1 to 3.

Further, as shown in FIG. 8, the second peak also appears in the case of Comparative Example 1 wherein the annealing treatment was conducted at 23° C. and Example 2 wherein the annealing treatment was conducted at 35° C. However, the temperature of the second peak is low and sufficient enhancement of the coefficient of restitution can not be obtained as is shown in Table 3 and FIG. 6. In the case of Comparative Example wherein the annealing treatment was conducted at 70° C., the second peak overlapped with the first peak and the degree of crystallization becomes high, but the impact resilience of the golf ball is the lowest.

Next, flying distance test and hit feeling test were conducted regarding the golf balls of Examples 1 and 2 and Comparative Examples 1 to 3. The results are shown in Table 5. In the flying distance test, the initial velocity of the ball and the total flying distance were measured. In addition, the impact resilience of each golf ball is also shown in Table 5.

TABLE 5

|  | Example 1 | Example 2 | Comp. Example 1 | Comp. Example 2 | Comp. Example 3 |
|---|---|---|---|---|---|
| Coefficient of restitution | 0.780 | 0.780 | 0.775 | 0.776 | 0.772 |
| Ball initial velocity (m/s) | 64.95 | 64.98 | 64.76 | 64.79 | 64.56 |
| Total flying distance (yard) | 244.5 | 243.8 | 239.8 | 236.7 | 234.6 |
| Hit feeling | good | good | slightly good | slightly good | inferior |

Flying distance test:
By using a swing-robot manufactured by True Temper Co., a golf ball was hit at a club-head speed of 45 m/second with a golf club of No. 1 wood. Ball initial velocity and total flying distance were measured and the average of 10 balls is determined.
Hit feeling test:
Five persons of professional and amateur golfers were asked to hit the golf balls. Their evaluations were asked.

As is clear from the results of Tables 3 and 6, even if the golf balls are prepared from the same material under the same molding condition, the impact resilience which is the most important characteristic for golf balls (the impact resilience is evaluated by the coefficient of restitution; the larger the coefficient of restitution, the higher the impact resilience) can varies depending upon the condition of annealing treatment. When annealing treatment is conducted at the temperature as shown in As shown in Table 5, golf balls of Examples 1 and 2 showed high ball initial velocity and long total flying distance in comparison with those of Comparative Examples 1 to 3. Further, golf balls of Examples 1 and 2 showed good hit feeling.

EXAMPLE 3 AND COMPARATIVE EXAMPLES 4 AND 5

As the ionomer resin, HI-MILAN 1707 was used. To 100 parts by weight of the ionomer resin (HI-MILAN 1707) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin (the resin used for the cover) was measured by the differential scanning calorimeter to determined the first peak temperature and the second peak temperature. The results are shown in Table 6.

TABLE 6

|  | Annealing treatment temp. (°C.) | Coefficient of restitution | First peak temp. (°C.) | Second peak temp. (°C.) |
|---|---|---|---|---|
| Example 3 | 50 | 0.7785 | 93 | 75 |
| Comp. Example 4 | 30 | 0.7725 | 92 | 58 |
| Comp. Example 5 | 70 | 0.7707 | 88 | — |

As shown in Table 6, a golf ball of Example 3 having the second peak at 75° C. within the temperature range of 70° to 80° C. showed high coefficient of restitution and high impact resilience in comparison with that of Comparative Example 4 having the second peak at 58° C. and that of Comparative Example 5 of which second peak overlaps with the first peak and lies in the temperature range higer than 80° C.

EXAMPLE 4 AND COMPARATIVE EXAMPLES 6 AND 7

As the ionomer resin, HI-MILAN 1706 was used. To 100 parts by weight of the ionomer resin (HI-MILAN 1706) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 7.

TABLE 7

|  | Annealing treatment temp. (°C.) | Coefficient of restitution | First peak temp. (°C.) | Second peak temp. (°C.) |
|---|---|---|---|---|
| Example 4 | 50 | 0.7738 | 92 | 73 |
| Comp. Example 6 | 30 | 0.7682 | 92 | 59 |
| Comp. Example 7 | 70 | 0.7588 | 87 | — |

As shown in Table 7, a golf ball of Example 4 having the second peak at 73° C. within the temperature range of 70° to 80° C. showed high coefficient of restitution and high impact resilience in comparison with that of Comparative Example 6 having the second peak at 59° C. and that of Comparative Example 7 of which second peak overlaps with the first peak and lies in the temperature range higher than 80° C.

EXAMPLE 5 AND COMPARATIVE EXAMPLES 8 AND 9

As the ionomer resin, HI-MILAN resin A was used. To 100 parts by weight of the ionomer resin (HI-MILAN resin A) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition. HI-MILAN resin A contains 15% by weight of methacrylic acid and is of the type neutralized by magnesium ions. The degree of neutralization by magnesium ions is about 45 mole %.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 8.

TABLE 8

|  | Annealing treatment temp. (°C.) | Coefficient of restitution | First peak temp. (°C.) | Second peak temp. (°C.) |
|---|---|---|---|---|
| Example 5 | 50 | 0.7730 | 91 | 74 |
| Comp. Example 8 | 30 | 0.7685 | 90 | 59 |
| Comp. Example 9 | 70 | 0.7701 | 88 | — |

As shown in Table 8, a golf ball of Example 5 having the second peak at 74° C. within the temperature range of 70° to 80° C. showed high coefficient of restitution and high impact resilience in comparison with that of Comparative Example 8 having the second peak at 59° C. and that of Comparative Example 9 of which second peak overlaps with the first peak and lies in the temperature range higher than 80° C.

EXAMPLE 6 AND COMPARATIVE EXAMPLES 10 AND 11

As the ionomer resin, HI-MILAN resin B was used. To 100 parts by weight of the ionomer resin (HI- MILAN resin B) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition. HI-MILAN resin B contains 15% by weight of methacrylic acid and is of the type neutralized by sodium ions and magnesium ions. The degree of neutralization by sodium ions and magnesium ions is about 45 mole %.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 9.

TABLE 9

| | Annealing treatment temp. (°C.) | Coefficient of restitution | First peak temp. (°C.) | Second peak temp. (°C.) |
| --- | --- | --- | --- | --- |
| Example 6 | 50 | 0.7790 | 93 | 74 |
| Comp. Example 10 | 30 | 0.7745 | 92 | 58 |
| Comp. Example 11 | 70 | 0.7725 | 89 | — |

As shown in Table 9, a golf ball of Example 3 having the second peak at 74° C. within the temperature range of 70° to 80° C. showed high resilience coefficient and high impact resilience in comparison with that of Comparative Example 10 having the second peak at 58° C. and that of Comparative Example 11 of which second peak overlaps with the first peak and lies in the temperature range higher than 80° C.

EXAMPLE 7 AND COMPARATIVE EXAMPLE 12 AND 13

As the ionomer resin, HI-MILAN 1707 and HI-MILAN 1706 were used. To 100 parts by weight of the ionomer resin mix (50 parts by weight of HI-MILAN 1707 and 50 parts by weight of HI-MILAN 1706) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 10.

TABLE 10

| | Annealing treatment temp. (°C.) | Coefficient of restitution | First peak temp. (°C.) | Second peak temp. (°C.) |
| --- | --- | --- | --- | --- |
| Example 7 | 50 | 0.7788 | 92 | 74 |
| Comp. Example 12 | 30 | 0.7733 | 93 | 59 |
| Comp. Example 13 | 70 | 0.7724 | 88 | — |

As shown in Table 10, a golf ball of Example 7 having the second peak at 74° C. within the temperature range of 70° to 80° C. showed high coefficient of restitution and high impact resilience in comparison with that of Comparative Example 12 having the second peak at 59° C. and that of Comparative Example 13 of which second peak overlaps with the first peak and lies in the temperature range higher than 80° C.

EXAMPLE 8 AND COMPARATIVE EXAMPLES 14 AND 15

As the ionomer resin, HI-MILAN 1707 and HI-MILAN resin A were used. To 100 parts by weight of the ionomer resin mix (50 parts by weight of HI-MILAN 1707 and 50 parts by weight of HI-MILAN resin A) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 11.

TABLE 11

| | Annealing treatment temp. (°C.) | Coefficient of restitution | First peak temp. (°C.) | Second peak temp. (°C.) |
| --- | --- | --- | --- | --- |
| Example 8 | 50 | 0.7759 | 92 | 73 |
| Comp. Example 14 | 30 | 0.7696 | 93 | 59 |
| Comp. Example 15 | 70 | 0.7716 | 88 | — |

As shown in Table 11, a golf ball of Example 8 having the second peak at 73° C. within the temperature range of 70° to 80° C. showed high coefficient of restitution and high impact resilience in comparison with that of Comparative Example 14 having the second peak at 59° C. and that of Comparative Example 15 of which second peak overlaps with the first peak and lies in the temperature range higer than 80° C.

EXAMPLE 9 AND COMPARATIVE EXAMPLES 16 AND 17

As the ionomer resin, HI-MILAN 1707 and HI-MILAN resin B were used. To 100 parts by weight of the ionomer resin mix (50 parts by weight of HI-MILAN 1707 and 50 parts by weight of HI-MILAN resin B) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 12.

TABLE 12

| | Annealing treatment temp. (°C.) | Coefficient of restitution | First peak temp. (°C.) | Second peak temp. (°C.) |
|---|---|---|---|---|
| Example 9 | 50 | 0.7761 | 93 | 74 |
| Comp. Example 16 | 30 | 0.7711 | 93 | 60 |
| Comp. Example 17 | 70 | 0.7693 | 89 | — |

As shown in Table 12, a golf ball of Example 9 having the second peak at 74° C. within the temperature range of 70° to 80° C. showed high coefficient of restitution and high impact resilience in comparison with that of Comparative Example 16 having the second peak at 60° C. and that of Comparative Example 17 of which second peak overlaps with the first peak and lies in the temperature range higer than 80° C.

EXAMPLE 10 AND COMPARATIVE EXAMPLE 18 AND 19

As the ionomer resin, HI-MILAN 1706 and HI-MILAN resin A were used. To 100 parts by weight of the ionomer resin mix (50 parts by weight of HI-MILAN 1707 and 50 parts by weight of HI-MILAN resin A) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 13.

TABLE 13

| | Annealing treatment temp. (°C.) | Coefficient of restitution | First peak temp. (°C.) | Second peak temp. (°C.) |
|---|---|---|---|---|
| Example 10 | 50 | 0.7754 | 92 | 74 |
| Comp. Example 18 | 30 | 0.7653 | 92 | 58 |
| Comp. Example 19 | 70 | 0.7674 | 88 | — |

As shown in Table 13, a golf ball of Example 10 having the second peak at 74° C. within the temperature range of 70° to 80° C. showed high coefficient of restitution and high impact resilience in comparison with that of Comparative Example 18 having the second peak at 58° C. and that of Comparative Example 19 of which second peak overlaps with the first peak and lies in the temperature range higer than 80° C.

EXAMPLE 11 AND COMPARATIVE EXAMPLES 20 AND 21

As the ionomer resin, HI-MILAN 1706 and HI-MILAN resin B were used. To 100 parts by weight of the ionomer resin mix (50 part by weight of HI-MILAN 1707 and 50 parts by weight of HI-MILAN resin B) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 14.

TABLE 14

| | Annealing treatment temp. (°C.) | Coefficient of restitution | First peak temp. (°C.) | Second peak temp. (°C.) |
|---|---|---|---|---|
| Example 11 | 50 | 0.7810 | 92 | 74 |
| Comp. Example 20 | 30 | 0.7761 | 92 | 60 |
| Comp. Example 21 | 70 | 0.7758 | 87 | — |

As shown in Table 14, a golf ball of Example 11 having the second peak at 74° C. within the temperature range of 70° to 80° C. showed high coefficient of restitution and high impact resilience in comparison with that of Comparative Example 20 having the second peak at 60° C. and that of Comparative Example 21 of which second peak overlaps with the first peak and lies in the temperature range higer than 80° C.

EXAMPLE 12 AND COMPARATIVE EXAMPLES 22 AND 23

As the ionomer resin, HI-MILAN resin A and HI-MIAN resin B were used. To 100 parts by weight of the ionomer resin mix (50 parts by weight of HI-MILAN resin A and 50 parts by weight of HI-MILAN resin B) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 15.

TABLE 15

| | Annealing treatment temp. (°C.) | Coefficient of restitution | First peak temp. (°C.) | Second peak temp. (°C.) |
| --- | --- | --- | --- | --- |
| Example 12 | 50 | 0.7784 | 93 | 74 |
| Comp. Example 22 | 30 | 0.7695 | 93 | 60 |
| Comp. Example 23 | 70 | 0.7728 | 88 | — |

As shown in Table 15, a golf ball of Example 12 having the second peak at 74° C. within the temperature range of 70° to 80° C. showed high coefficient of restitution and high impact resilience in comparison with that of Comparative Example 22 having the second peak at 60° C. and that of Comparative Example 23 of which second peak overlaps with the first peak and lies in the temperature range higer than 80° C.

EXAMPLE 13 AND COMPARATIVE EXAMPLES 24 AND 25

As the ionomer resin, HI-MILAN 1555 was used. To 100 parts by weight of the ionomer resin (HI-MILAN 1555) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition. HI-MILAN 1555 contains 11% by weight of methacrylic acid and is of type neutralized by sodium ions. The degree of neutralization by sodium ions is about 35 mole %.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differenitial scanning calorimeter to determine the first peak temperature and the second peak temperature. The results are shown in Table 16.

TABLE 16

| | Annealing treatment temp. (°C.) | Coefficient of restitution | First peak temp. (°C.) | Second peak temp. (°C.) |
| --- | --- | --- | --- | --- |
| Example 13 | 50 | 0.7592 | 94 | 75 |
| Comp. | 30 | 0.7541 | 93 | 59 |
| Example 24 | | | | |
| Comp. Example 25 | 70 | 0.7524 | 90 | — |

As shown in Table 16, a golf ball of Example 13 having the second peak at 75° C. within the temperature range of 70° to 80° C. showed high coefficient of restitution and high impact resilience in comparison with that of Comparative Example 24 having the second peak at 59° C. and that of Comparative Example 25 of which second peak overlaps with the first peak and lies in the temperature range higer than 80° C.

EXAMPLE 14 AND COMPARATIVE EXAMPLES 26 AND 27

As the ionomer resin, HI-MILAN 1557 was used. To 100 parts by weight of the ionomer resin (HI-MILAN 1557) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition. HI-MILAN 1557 contains 11% by weight of methacrylic acid and is of the type neutralized by zinc ions. The degree of neutralization by zinc ions is not less than about 55 mole %.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 17.

TABLE 17

| | Annealing treatment temp. (°C.) | Coefficient of restitution | First peak temp. (°C.) | Second peak temp. (°C.) |
| --- | --- | --- | --- | --- |
| Example 14 | 50 | 0.7593 | 93 | 74 |
| Comp. Example 26 | 30 | 0.7564 | 94 | 59 |
| Comp. Example 27 | 70 | 0.7496 | 90 | — |

As shown in Table 17, a golf ball of Example 14 having the second peak at 74° C. within the temperature range of 70° to 80° C. showed high coefficient of restitution and high impact resilience in comparison with that of Comparative Example 26 having the second peak at 59° C. and that of Comparative Example 27 of which second peak overlaps with the first peak and lies in the temperature range higer than 80° C.

EXAMPLE 15 AND COMPARATIVE EXAMPLES 28 AND 29

As the ionomer resin, HI-MILAN 1555 and HI-MILAN 1557 were used. To 100 parts by weight of the ionomer resin mix (50 parts by weight of HI-MILAN 1555 and 50% by weight of HI-MILAN 1557) were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 18.

TABLE 18

| | Annealing treatment temp. (°C.) | Coefficient of restitution | First peak temp. (°C.) | Second peak temp. (°C.) |
|---|---|---|---|---|
| Example 15 | 50 | 0.7665 | 93 | 74 |
| Comp. Example 28 | 30 | 0.7620 | 92 | 60 |
| Comp. Example 29 | 70 | 0.7596 | 89 | — |

As shown in Table 18, a golf ball of Example 15 having the second peak at 74° C. within the temperature range of 70° to 80° C. showed high coefficient of restitution and high impact resilience in comparison with that of Comparative Example 28 having the second peak at 60° C. and that of Comparative Example 29 of which second peak overlaps with the first peak and lies in the temperature range higer than 80° C.

COMPARATIVE EXAMPLES 30 TO 32

Instead of the ionomer resin, low density polyethylene (Utlzex 3550R manufactured by Mitsui Petrochemical K.K.) was used. To 100 parts by weight of the low density polyethylene were added 1 part by weight of titanium oxide, 3 parts by weight of precipitated barium sulfate, 0.01 parts by weight of an antioxidant and 0.001 parts by weight of a lubricant and the mixture was kneaded to prepare a cover composition.

The resulting cover composition was injection-molded to cover the same solid core as that of Experiment Example 1 to prepare a golf ball having a diameter of 42.8 mm. After the golf ball was stored at room temperature for 24 hours, it was subjected to annealing treatment at 30° C., 50° C. and 70° C., respectively, for 72 hours.

The golf ball after annealing treatment was stored at room temperature for 24 hours to cool, and the coefficient of restitution was measured. Then, the cover resin was measured by the differential scanning calorimeter to determine the first peak temperature and the second peak temperature. The results are shown in Table 19.

TABLE 19

| | Annealing treatment temp. (°C.) | Coefficient of restitution | First peak temp. (°C.) | Second peak temp. (°C.) |
|---|---|---|---|---|
| Comp. Example 30 | 50 | 0.7198 | 120 | — |
| Comp. Example 31 | 30 | 0.7203 | 120 | — |
| Comp. Example 32 | 70 | 0.7219 | 121 | — |

Comparative Examples 30 to 32 relate to a golf ball wherein low density polyethylene containing neither unsaturated carboxylic acid nor its metal salt was used as the cover resin. As shown in Table 19, no second peak was observed and, further, there was almost no difference in coefficient of restitution due to difference in annealing temperature and, therefore, no enhancement of the coefficient of restitution was observed. Further, it is considered to be caused by thermal hardening of the core that the coefficient of restitution slightly increases with increasing the temperature of annealing treatment.

In Examples 3 to 15 and Comparative Examples 4 to 29 described above, various ionomer resins were selected to examine the differences in impact resilience due to differences in the temperature of annealing treatment. As shown in Tables 6 to 18, any ionomer resin has high coefficient of restitution when it was subjected to annealing treatment at 50° C. in comparison with the case when it was subjected to annealing treatment at 30° C. or 70° C., which results in golf balls having high impact resilience.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A golf ball comprising a core and a cover for covering the core, said cover containing an ionomer resin as a main material, said ionomer resin having the first peak at 85° to 95° C. and the second peak at 70° to 80° C. in its crystal melting behavior attended with the measurement by a differential scanning calorimeter when the resin is heated from −30° C. to 150° C. at a heating rate of 10° C./minute, the ionomer resin being obtained by subjecting an ionic ethylene copolymer composed of three components of α-olefin, α, β-ethylenic unsaturated carboxylic acid, and α, β-ethylenic unsaturated carboxylic acid metal salt, or four components of α-olefin, α, β-ethylenic unsaturated carboxylic acid, α, β-ethylenic unsaturated carboxylic acid metal salt, and α, β-ethylenic unsaturated carboxylic acid ester to partial metal crosslinking, and wherein the ionomer resin is one of monovalent metal ions or divalent metal ions as metal ions for partially neutralizing α, β-ethylenic unsaturated carboxylic acid and a degree of neutralization by the metal ions being 30 to 70% of the carboxyl group of the carboxylic acid, the acid content being 10 to 20% by weight.

2. A process for producing a golf ball, comprising the steps of providing a core and a cover for the core, the cover containing an ionomer resin as a main material, subjecting the ionomer resin for the cover which has been covered on the core to annealing treatment at 45° to 63° C. for 3 to 240 hours so that the ionomer resin has a first peak at 85° to 95° C. and a second peak at 70° to 80° C. in its crystal melting behavior attended with the measurement by a differential scanning calorimeter when the resin is heated from −30° C. to 150° C. at a heating rate of 10° C./minute, subjecting an ionic ethylene copolymer composed of three components of α-olefin, α, β-ethylenic unsaturated carboxylic acid, and α, β-ethylenic unsaturated carboxylic acid metal salt, or four components of α-olefin, α, β-ethylenic unsaturated carboxylic acid, α, β-ethylenic unsaturated carboxylic acid metal salt, and α, β-ethylenic unsaturated carboxylic acid ester to partial metal crosslinking to thereby obtain the ionomer resin, wherein the ionomer resin is one of monovalent metal ions or divalent metal ions as metal ions for partially neutralizing α, β-ethylenic unsaturated carboxylic acid and a degree of neutralization by the metal ions being 30 to 70% of the carboxyl group of the carboxylic acid, the acid content being 10 to 20% by weight.

3. A golf ball produced in accordance with the method of claim 2.

* * * * *